United States Patent

Gildner

[15] 3,693,436
[45] Sept. 26, 1972

[54] LIQUID FLOW METER
[72] Inventor: Kenneth J. Gildner, New Milford, Conn.
[73] Assignee: Laboratory Data Control, Inc., Danbury, Conn.
[22] Filed: Aug. 28, 1970
[21] Appl. No.: 67,796

[52] U.S. Cl. .................................73/194 E, 250/218
[51] Int. Cl. ................................................G01f 1/00
[58] Field of Search .........73/194 R, 194 E; 222/422; 250/218

[56] References Cited

UNITED STATES PATENTS

| 3,403,555 | 10/1968 | Versaci et al. | 73/194 E |
| 3,308,660 | 3/1967 | Ford | 73/194 E |
| 2,808,580 | 10/1957 | Fuller | 73/432 |

FOREIGN PATENTS OR APPLICATIONS 1,109,269  4/1968  Great Britain.............250/218

Primary Examiner—Jerry W. Myracle
Attorney—Buckles and Bramblett

[57] ABSTRACT

There is disclosed a liquid flow meter comprising a transparent glass tube upon which is positioned a pair of spaced photodetectors. The liquid to be measured is passed through the tube and through the detectors. A supply tank filled with gas at a suitable pressure is connected to a valve which, when actuated, injects into the liquid stream a bubble of predetermined size. Passage of the bubble through the two photodetectors actuates a timing circuit which displays the elapsed time, thereby giving an accurate measurement of flow rate.

7 Claims, 14 Drawing Figures

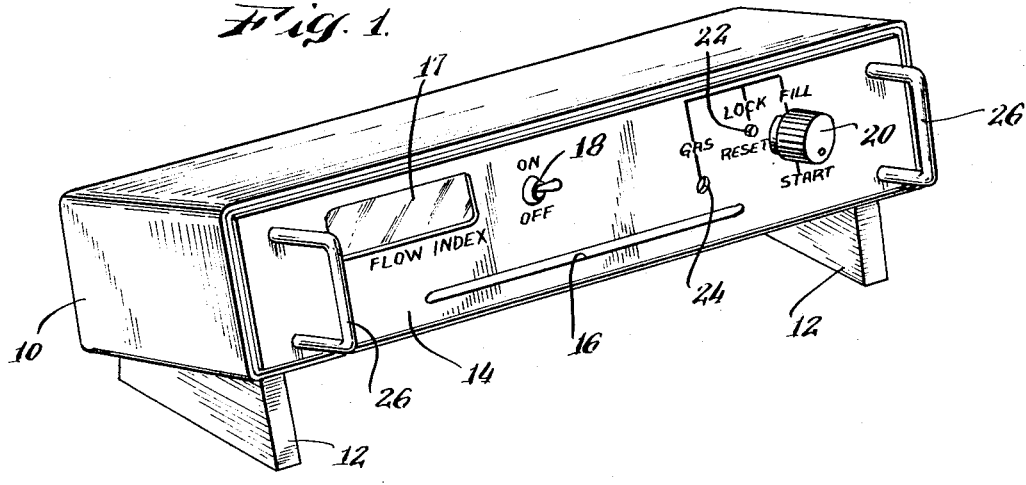
Fig. 1.
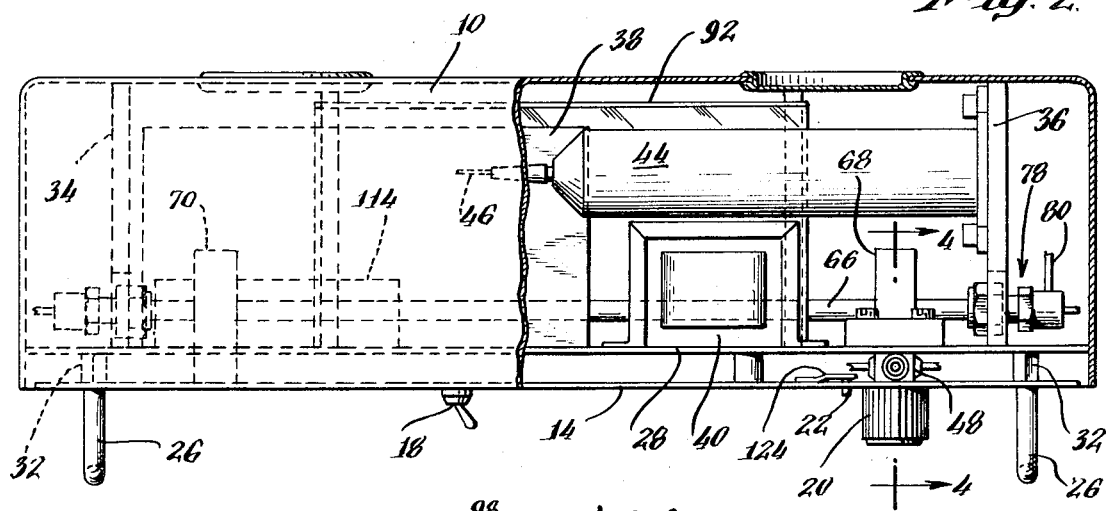
Fig. 2.
Fig. 3.
INVENTOR.
Kenneth J. Gildner

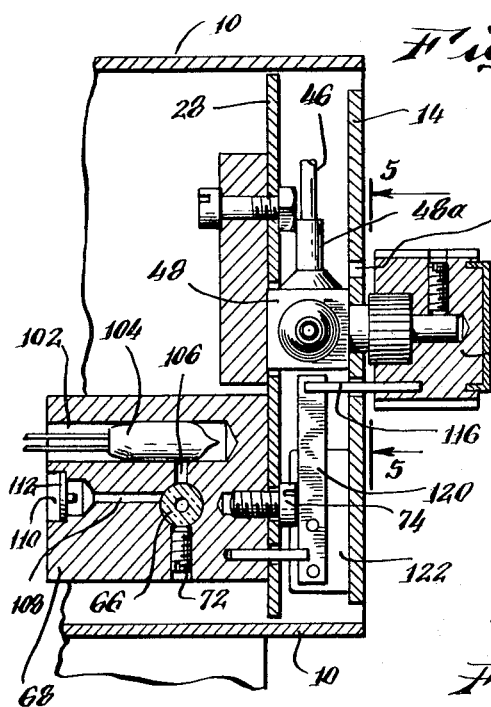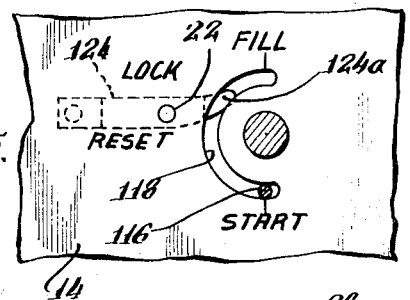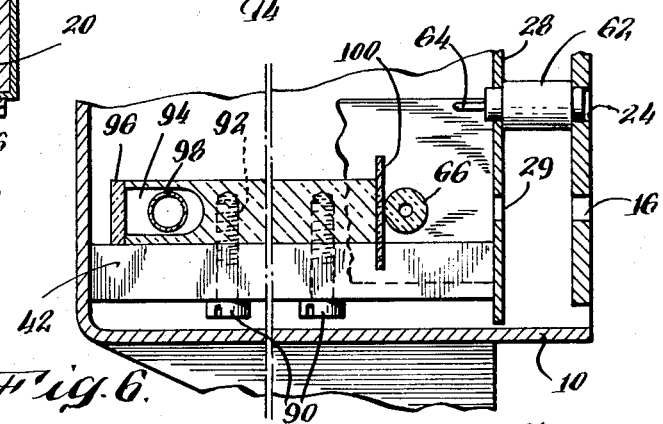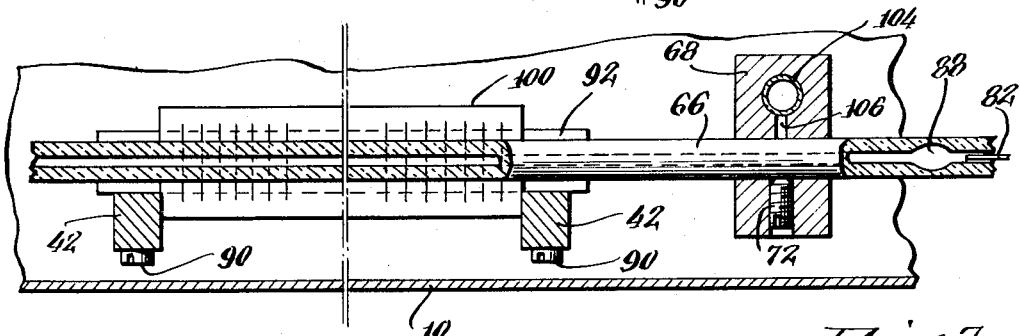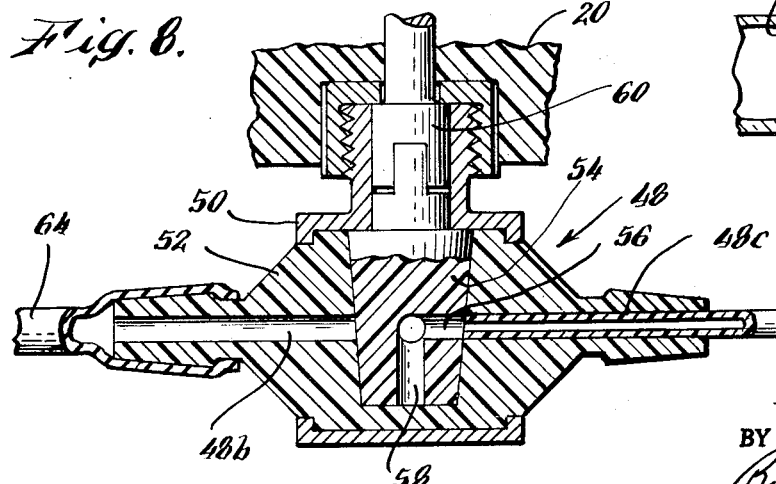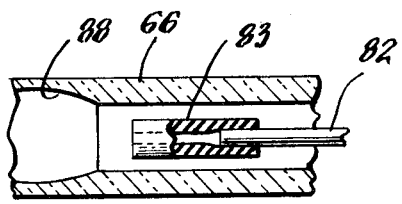

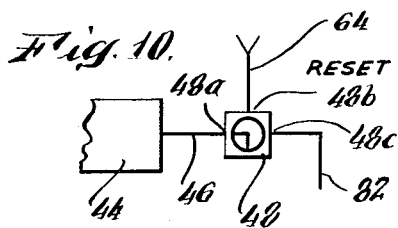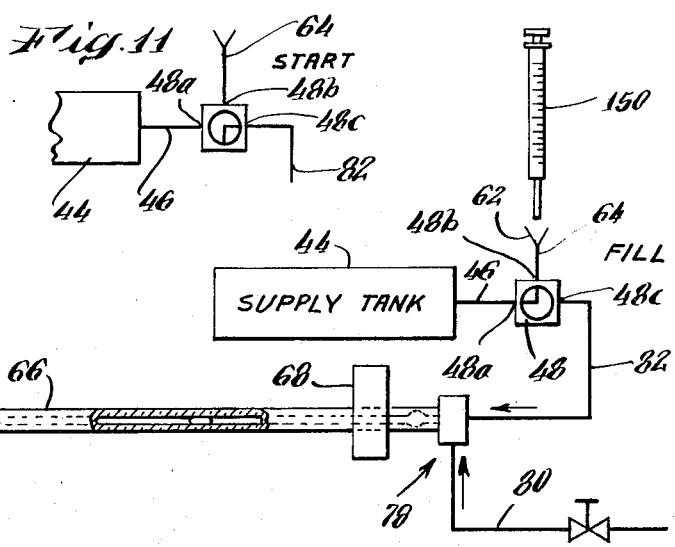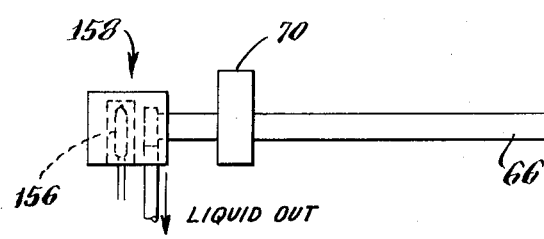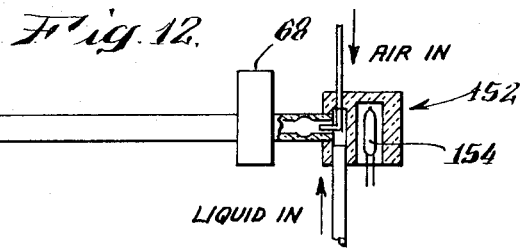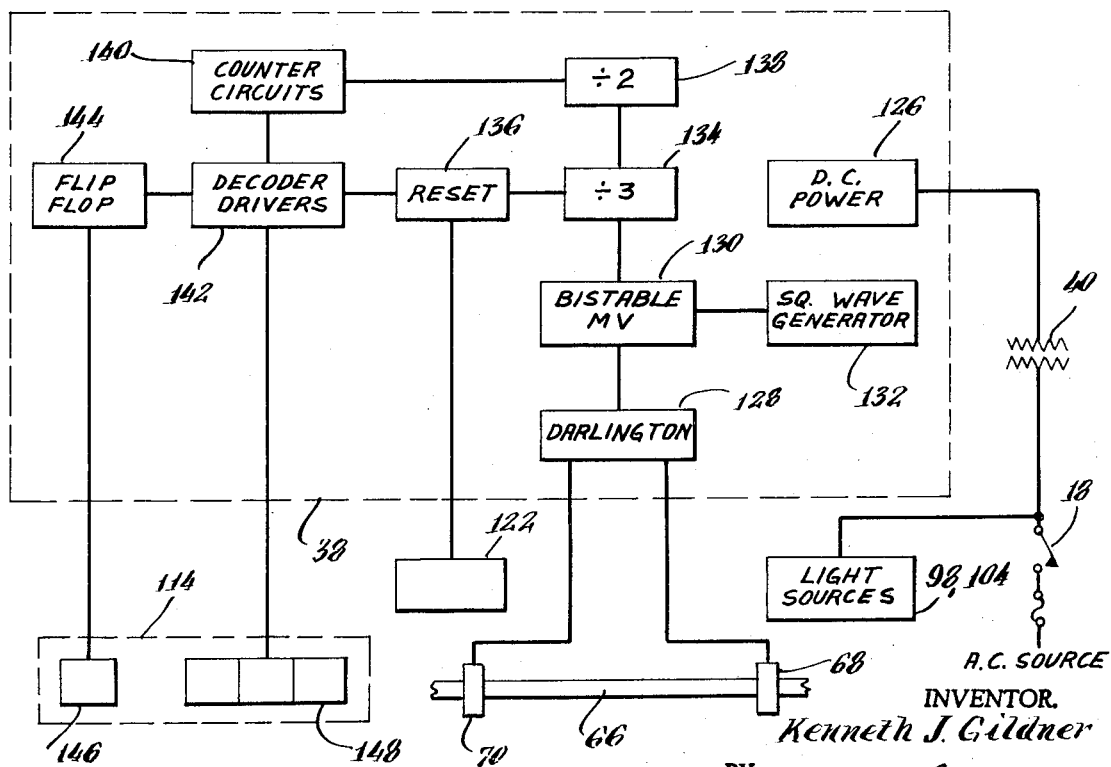

LIQUID FLOW METER

BACKGROUND OF THE INVENTION

Bubble transit time has been used for some years to measure the flow rate of a liquid. In prior art devices, such as in liquid chromatographs, for example, a bubble is injected into a liquid which passes through a transparent tube. The tube is usually provided with a pair of spaced markings and the bubble transit time is customarily measured by means of a stop watch. The accuracy of such devices is quite limited, due to the fact that human judgment is involved. Furthermore, they are limited in accuracy due to the difficulty of conveniently injecting bubbles of proper and reproducible size.

Accordingly it is a primary object of the present invention to provide improved means for measuring liquid flow. Other objects of the invention are to provide such means wherein: bubbles of accurate size are readily obtained; all measurements are performed automatically; and human judgment is not required.

Other objects, features, and advantages will become apparent from the following description and the appended claims.

SUMMARY OF THE INVENTION

The liquid flow meter of this invention comprises an elongated transparent metering tube having an inlet and an outlet. Means are provided for passing through this tube, from its inlet to its outlet, a liquid stream whose flow is to be measured. Other means are provided for injecting a gas bubble into the liquid stream at the inlet end of the tube. A first detector is positioned on the tube and generates a first signal on passage of the bubble thereby. A second detector is also positioned on the tube, but downstream from the first detector, and generates a second signal on passage of the bubble. Means are provided which are responsive to the first and second signals for indicating the time lapse therebetween.

BRIEF DESCRIPTION OF THE DRAWINGS

The invention may be best understood by reference to the attached drawings wherein:

FIG. 1 is a perspective view of a flow meter constructed in accordance with this invention;

FIG. 2 is a plan view of the meter of FIG. 1, partially broken away to illustrate its internal construction;

FIG. 3 is a cross section taken in a plane below that of FIG. 2;

FIG. 4 is an enlarged cross section taken substantially along line 4—4 of FIG. 2;

FIG. 5 is a cross section taken substantially along line 5—5 of FIG. 4;

FIG. 6 is an enlarged cross section taken substantially along the line 6—6 of FIG. 3;

FIG. 7 is an enlarged cross section taken substantially along the line 7—7 of FIG. 3;

FIG. 7A is a greatly enlarged detail of a portion of FIG. 7;

FIG. 8 is an enlarged partial cross section of the bubble producing valve of this invention;

FIG. 9 is a schematic diagram of the meter of the invention;

FIGS. 10 and 11 illustrate the action of the bubble producing valve of this invention;

FIG. 12 illustrates a modification of the invention; and

FIG. 13 is a block diagram of the electronic circuitry of the meter of this invention.

DESCRIPTION OF THE PREFERRED EMBODIMENTS

As will best be seen from FIG. 1, the meter of this invention comprises an outer housing 10 of generally rectangular configuration provided with legs 12 for maintaining it in an angled, easily viewable, position. The open front of housing 10 is closed by a panel 14 defining an elongated viewing slot 16 and a window 17. Also mounted on panel 14 are an on-off switch 18, a control knob 20, and a lock button 22. The panel 14 also defines a gas injection opening 24.

Connected to each end of front panel 14 is a U-shaped handle 26. The ends of each handle extend through the front panel and are secured to a chassis board 28 by means of bolts 30 and spacers 32. Chassis board 28 defines a slot aperture 29 aligned with the viewing slot 16 in front panel 14. Extending from chassis board 28 to the rear of housing 10 are a left wall member 34 and right wall member 36. The lower front corners of the wall members are cut away, as shown in FIG. 3, to provide clearance for the metering tube 66, which will later be described. Mounted on chassis board 28 and positioned in housing 10 are a printed circuit board 38 and a transformer 40. Also extending between chassis board 28 and the rear of housing 10 are a pair of struts 42. Mounted on right wall member 36 is a cylindrical supply tank 44. Supply tank 44 is connected by means of a capillary tube 46 to one port 48a of a three-way valve 48.

Valve 48 is a relatively conventional three-way valve. As seen in FIG. 8, it comprises a metallic housing 50 containing a plastic valve body 52 with the three ports 48a (not shown), 48b, 48c. A plastic rotor 54 has a conventional L-shaped channel 56 for selectively interconnecting any two adjacent ports. The valve illustrated in FIG. 8 is modified by drilling a bore 58 into the L-shaped channel to increase its volume. The rotor is operated by a conventional shaft and coupling 60 from knob 20. Port 48b of valve 48 is connected to an injection port 62 (FIG. 6) by means of capillary tubing 64.

Mounted behind, and aligned with, the viewing slot 16 in front panel 14 and the aperture 29 in the chassis board 28 is a glass metering tube 66. Metering tube 66 is mounted to chassis board 28 by means of rectangular detector blocks 68, 70. As will be apparent from FIG. 4, each detector block is secured to the metering tube by means of a set screw 72. The detector blocks, in turn, are secured to chassis board 28 by means of screws 74 which extend through horizontal positioning slots 76 provided in the chassis board. The inlet end of metering tube 66 is connected to the liquid source to be measured by means of an inlet coupling 78 and a fluid inlet tube 80. Also included in inlet coupling 78 is the end of a capillary tube 82. The outlet end of metering tube 66 is connected through an outlet coupling 84 to a suitable discharge line 86. As will be apparent from FIG. 7, the bore of metering tube 66 is substantially uniform, it may, in fact, be a precision bore. However, at the inlet end, just downstream of capillary tube 82 but upstream of detector block 68, the bore is provided with an enlarged portion 88. Its function will be later explained.

Mounted on struts 42 by means of screws 90 is a rectangular plastic light pipe 92. The rear edge of light pipe 92 defines a recess 94, closed by a backing plate 96, housing a plurality of neon lights 98. The forward edge of light pipe 92 is positioned directly behind metering tube 66 and carries a paper or plastic light diffuser 100, which may be provided with suitable indicia as shown in FIG. 7.

In addition to their function of mounting metering tube 66, each of the detector blocks 68, 70 also serves as a detector. To this end, as seen in FIG. 4, each is provided with a recess 102, which houses a neon light 104 and a vertical light passage 106 for illuminating tube 66 from light 104. Another light passage 108, at right angles to passage 106, extends rearwardly to a larger recess 110 containing a photocell 112. These detectors operate through a circuit to be later described to actuate a digital display 114 mounted behind window 17. The digital display is conventional and comprises a single neon tube to represent the numeral 1 and three Nixie tubes (a trademark of Burrows Corporation), each of which is capable of displaying the digits 0-9. The last digit represents a decimal and the total display is capable of displaying 2,000 numbers (000.0 to 199.9).

It will be noted from FIGS. 4 and 5 that knob 20 carries a pin 116 which extends through an arcuate slot 118 in panel 14. The knob is thereby restrained to an arcuate movement of approximately 180°. The panel 14 is marked to indicate three positions of the knob and its associated valve 48. As shown in FIG. 5, these positions are indicated as "Start," "Reset," and "Fill." With the knob in the "Start" position, pin 116 bears against the operating leaf 120 of a normally closed microswitch 122, thereby holding the switch open. The switch closes when the knob 20 is moved to the "Reset" position. Mounted on the back of panel 14, and in the path of movement of pin 16 between the "Reset" and "Fill" positions, is a spring latch 124. The latch is so positioned that it obstructs the upward movement of pin 116 and normally prevents the knob from being turned to the "Fill" position. However, depression of lock button 22 forces the latch rearwardly, permitting passage of pin 116 and rotation of knob 20 to the "Fill" position. The end 124a of latch 124 is bent in such a fashion as to be cammed outwardly by pin 116 upon counterclockwise rotation of the knob from the "Fill" position, so that a second depression of lock button 22 is unnecessary.

Briefly stated, the operation of the flow meter of this invention involves the injection of a bubble into the liquid flowing through metering tube 66. Bubble passage is sensed first by detector block 68 which starts a digital counter. The same bubble is later sensed by detector block 70 which stops the counting sequence. The digital display seen in window 17 represents the bubble transit time between detector blocks 68 and 70. This is accomplished by a relatively conventional counting circuit which is illustrated in block diagram form in FIG. 13. Most of the elements of the circuit are included on printed circuit board 38. These include a d.c. power supply 126 powered from transformer 40 which supplies the various circuit elements. Signals from each of the detector blocks 68, 70 are supplied to the Darlington circuit 128 which, in turn, starts and stops a bistable multivibrator 130. The input to multivibrator 130 is a squarewave generator 132 which is synchronized to line frequency, normally 60 hertz. The output from bistable multivibrator 130 is supplied to a "divide by 3" counter 134. The output from counter 134 is supplied through a reset circuit, 136, controlled from reset switch 122, and also to a "divide by 2" counter 138. Counter circuits 140, decoder drivers 142 and flip-flop 144 function in the usual manner to control the digital display 114, comprising the neon tube 146 and the Nixie tubes 148.

When a gas bubble is introduced into a tube containing a moving liquid for measurement purposes, the gas bubble should move at the same velocity as the liquid. For this to hold true over a wide range of conditions, it is important that the gas bubble be somewhat larger than the bore of the tube. When this is true, the gas bubble represents a reference point within the liquid stream. By means of the present invention, it is possible to introduce into the liquid stream, bubbles of proper and reproducible size. This is achieved by means of the relatively large supply tank 44 and its unique combination with the valve 48. Operation of these elements will be most clearly understood by reference to FIGS. 9-11.

In order to fill supply tank 44 to the necessary pressure, the lock button 22 is depressed and the knob rotated to the "Fill" position. As shown in FIG. 9, supply tank 44 will then be open to atmosphere through injection port 62. A syringe 150 is then set to the desired volume of gas (air) to be injected, for example, 50 milliliters. The syringe is applied to the injection port 62 and the plunger depressed, forcing the contained air into supply tank 44. With the syringe still in place, the knob 20 is turned to the "Reset" position as shown in FIG. 10, after which the syringe may be removed.

Turning now to FIG. 10, it will be noted that the valve channel is now connected to the supply tank 44 and to a blank position on the valve stator. It will thus be apparent that the valve channel 56 and the bore 58 (FIG. 8) are filled with gas at supply tank pressure. To inject a bubble into the liquid stream, it is necessary merely to move the knob to the "Start" position as shown in FIG. 11. The volume of pressurized gas within the valve is now connected directly to capillary tube 82 which terminates in the inlet end of metering tube 66 as seen in FIG. 7. Expansion of gas out of the capillary tube thus results in the production of a bubble of controlled size which is easily reproducible. As many as 1,000 bubbles, for example, may be sequentially introduced from one filling of the supply tank 44.

Introduction of a bubble into a rapidly moving stream occasionally results in the bubble being broken up. This difficulty is overcome in this invention by the enlarged bore portion 88. As the liquid velocity in this portion is reduced, it allows the bubble to agglomerate and retain its identity before moving downstream. In addition, a ⅛ inch section of 0.020 inch I.D. tubing 83 of a non-wetting plastic such as polytetrafluoroethylene is connected to the end of tube 82. This "nozzle" tends to hold onto the bubble until its size is such that the liquid stream pressure forces it to break away. This feature extends the dynamic range of the instrument.

When the knob 20 was initially moved past the "Reset" position, it permitted switch 122 to close, thereby zeroing the digital display. The display is ready for operation as the bubble starts down the metering tube 66.

Turning now to FIG. 4, it will be noted that light from neon light 104 impinges on metering tube 66 through light passage 106. Furthermore, the photocell 112 is also mounted at the end of an elongated light passage 108. The resultant optical stops and apertures thereby limit the viewing area of the photocell so that it only "sees" a small area on the metering tube. Source light incident on the metering tube is reflected and refracted back to the photocell 112 from the gas bubble-glass tube interface. The right angle position of the two light paths optimizes light conditions at the photocell. The centerline of passage 108 is tangent to the top of the bore of tube 66. This provides maximum signal to background light and also minimizes ambient background light from the source. A short, bright light pulse, resulting from bubble passage at detector block 68, produces an electrical signal from the photocell and thereby initiates the digital counting action.

The detector block 70 is similar in construction to detector block 68, and a similar pulse resulting from bubble passage thereby stops the counting action. The exact metered volume can be determined in two ways: first, by employing a precision bore tube. It is then only necessary to accurately set the distance between the detector blocks. With the second method, any tube may be used. When calibrating, one detector is fixed near one end of the tube. The second detector is then moved along the tube until the bubble transit time corresponds to a known flow rate moving through the tube. As metering tube 66 is illuminated by light from light pipe 92, the bubble's progression may also be followed visually.

The sizes of the various elements of this invention may, of course, be varied to suit the particular conditions. However, in one embodiment of this invention the supply tank 44 is of such a size as to reach a pressure of approximately 28 lbs. per square inch on injection of 100 milliliters of air. The metering tube 66 has a volume of 0.500 milliliters. The volume and flow resistance of tube 28 should be consistent with supply tank pressure, internal volume of rotor 54 of valve 48, and velocity and pressure of the fluid being metered. For optimum single bubble production, the gas velocity should be close to the liquid velocity.

In the foregoing embodiment, the incident light for marking passage is generated at each detector, the output pulse being the result of the glass-gas interface. However, it is also possible to illuminate the gas bubbles at either end, utilizing the output flash from the liquid-gas interface. This is accomplished as shown in FIG. 12, wherein the inlet assembly 152 includes a light source 154. The light from source 154 passes through the bore of tube 66, thereby illuminating the upstream end of the bubble. The downstream end may be similarly illuminated by a light source 156 contained in an outlet assembly 158. It should also be noted that the ends of each bubble can be illuminated with different wavelengths of light. For example, the meniscus facing in the direction of fluid flow can be illuminated with red light while, at the same time, the meniscus facing away from fluid flow can be illuminated with green light. If two photocells, each with a specific sensitivity for a specific wavelength, are now incorporated in the instrument, two points of information can be obtained from a single bubble. Data of this nature would yield information related to the change in bubble size as a function of fluid pressure, or gas being dissolved in the carrier fluid.

It is believed that the many advantages of this invention will now be apparent to those skilled in the art. It will also be apparent that a number of variations and modifications may be made therein without departing from its spirit and scope. Accordingly, the foregoing description is to be construed as illustrative only. This invention is limited only by the scope of the following claims.

I claim:

1. A liquid flow meter which comprises: an elongated transparent metering tube having an inlet and an outlet; means for passing through said tube, from said inlet to said outlet, a liquid stream whose flow is to be measured; a tank for pressurized gas; a gas injection conduit; a valve including a reservoir selectively and alternatively positionable to a first position interconnecting said gas injection conduit and said tank, a second position in fluid flow relationship solely to said tank, and a third position in fluid flow relationship solely to said liquid stream at said inlet; first detector means positioned on said tube for generating a first signal on passage of a bubble thereby; second detector means positioned on said tube downstream from said first detector means for generating a second signal on passage of said bubble thereby; and means responsive to said first and second signals for indicating the time lapse therebetween.

2. The meter of claim 1 wherein said tube defines an enlarged portion upstream of said first detector means.

3. The meter of claim 1 wherein at least a portion of said bubble is illuminated and each of said detector means comprises: light responsive means positioned to receive illumination from said bubble and generate said signal in response thereto.

4. A liquid flow meter which comprises: an elongated transparent metering tube having an inlet and an outlet; means for passing through said tube, from said inlet to said outlet, a liquid stream whose flow is to be measured; a tank for pressurized gas; a gas injection conduit; a valve including a reservoir selectively and alternatively positionable to a first position interconnecting said gas injection conduit and said tank, a second position in fluid flow relationship solely to said tank, and a third position in fluid flow relationship solely to said liquid stream to inject a gas bubble therein at said inlet; first detector means positioned on said tube for generating a first signal on passage of a bubble thereby; second detector means positioned on said tube downstream from said first detector means for generating a second signal on passage of said bubble thereby; and means responsive to said first and second signals for indicating the time lapse therebetween.

5. The meter of claim 4 wherein said responsive means comprises: a timing circuit; and digital display means responsive thereto.

6. The meter of claim 5 wherein said valve comprises: means for resetting said digital display means prior to each injection of a bubble into said liquid stream.

7. The meter of claim 4 wherein said metering tube includes bubble release means at its inlet communicating with said valve when in its third position comprising a non-wettable plastic nozzle.

* * * * *